United States Patent
Usami

(10) Patent No.: US 8,812,800 B2
(45) Date of Patent: Aug. 19, 2014

(54) STORAGE APPARATUS AND STORAGE MANAGEMENT METHOD

(75) Inventor: Kazuhiro Usami, Odawara (JP)

(73) Assignee: Hitachi Ltd., Tokyo (JP)

( * ) Notice: Subject to any disclaimer, the term of this patent is extended or adjusted under 35 U.S.C. 154(b) by 864 days.

(21) Appl. No.: 12/811,661

(22) PCT Filed: Jun. 24, 2010

(86) PCT No.: PCT/JP2010/004211
§ 371 (c)(1),
(2), (4) Date: Jul. 2, 2010

(87) PCT Pub. No.: WO2011/161725
PCT Pub. Date: Dec. 29, 2011

(65) Prior Publication Data
US 2011/0320707 A1   Dec. 29, 2011

(51) Int. Cl.
*G06F 12/16* (2006.01)
*G06F 3/06* (2006.01)
*G06F 11/14* (2006.01)

(52) U.S. Cl.
CPC .......... *G06F 3/0665* (2013.01); *G06F 11/1466* (2013.01); *G06F 11/1456* (2013.01); *G06F 3/061* (2013.01); *G06F 2201/815* (2013.01); *G06F 3/0631* (2013.01); *G06F 3/0685* (2013.01); *G06F 3/065* (2013.01)
USPC .......... 711/162; 711/111; 711/112; 711/114; 711/161; 714/6.3

(58) Field of Classification Search
None
See application file for complete search history.

(56) References Cited

U.S. PATENT DOCUMENTS

| | | | |
|---|---|---|---|
| 7,222,172 B2 * | 5/2007 | Arakawa et al. | 709/224 |
| 7,536,522 B2 * | 5/2009 | Asano et al. | 711/162 |
| 2004/0024961 A1 | 2/2004 | Cochran et al. | |
| 2007/0113004 A1 * | 5/2007 | Sugimoto et al. | 711/112 |
| 2008/0282047 A1 | 11/2008 | Arakawa et al. | |
| 2009/0006733 A1 | 1/2009 | Gold et al. | |
| 2009/0077315 A1 | 3/2009 | Ogasawara | |
| 2009/0132617 A1 | 5/2009 | Soran et al. | |

FOREIGN PATENT DOCUMENTS

JP    2008-282382    11/2008

\* cited by examiner

*Primary Examiner* — Matthew Bradley
*Assistant Examiner* — Alan Otto
(74) *Attorney, Agent, or Firm* — Brundidge & Stanger, P.C.

(57) ABSTRACT

The performance to transfer data to external storage media in thin provisioning is enhanced.

A storage apparatus is connected via a network to a host system writing of data and to a tape management apparatus for managing tape storage media for storing the data. The storage apparatus is designed so that data, for which a write request is issued by the host system, is stored in a virtual volume; a predetermined area in a plurality of storage devices is allocated to a data storage area in the virtual volume storing the data; and if the virtual volume is a backup object to be backed up to the tape storage media, a predetermined area in a specified storage device, from among the plurality of storage devices, is allocated to the data storage area in the virtual volume; and if the virtual volume is not a backup object to be backed up to the tape storage media, a predetermined area in an unspecified storage device, from among the plurality of storage devices, is allocated to the data storage area in the virtual volume.

7 Claims, 16 Drawing Sheets

FIG.7

| VOLUME NUMBER 251 | SEGMENT NUMBER 252 | WHETHER ALLOCATED OR NOT 253 | POOL NUMBER 254 | PAGE NUMBER 255 |
|---|---|---|---|---|
| 0 | 0 | YES | 0 | 100 |
| | 1 | NO | | |
| | 2 | YES | 0 | 200 |
| | ... | | | |
| 1 | 0 | YES | 1 | 22 |
| | 1 | YES | 1 | 77 |
| | 2 | NO | | |
| | ... | | | |
| ... | | | | |

| POOL NUMBER | RAID GROUP NUMBER | NUMBER OF REMAINING PAGES | D2T TRANSFER QUANTITY |
|---|---|---|---|
| 0 | 0 | 1500 | 1 |
| | 1 | 1000 | 0 |
| | 2 | 1200 | 1 |
| | ... | | |
| 1 | 10 | 2000 | 2 |
| | 11 | 1800 | 1 |
| | 12 | 1600 | 1 |
| ... | ... | | |

| VOLUME NUMBER | PAGE ALLOCATION METHOD | ALLOCATING RAID GROUP NUMBER |
|---|---|---|
| 0 | NORMAL | — |
| 1 | NORMAL | — |
| 2 | D2T | 100 |
| 3 | D2T | 200 |
| 4 | NORMAL | — |
| 5 | NORMAL | — |
| 6 | NORMAL | — |
| 7 | NORMAL | |
| ... | | |

STORAGE APPARATUS AND STORAGE MANAGEMENT METHOD

TECHNICAL FIELD

The present invention relates to a storage apparatus and a storage management method and is suited for use in, for example, a storage apparatus and storage management method for managing data transfer performance for backup/restoration of data to tape storage media.

BACKGROUND ART

Recently, along with scale expansion and growing complexity of a storage environment due to an increase of company data, thin provisioning utilizing virtual volumes (hereinafter referred to as the virtual volumes) which do not have their own storage areas has become widely used (for example, see Patent Literature 1) for the purpose of facilitation of operation management and integration of the storage environment.

With the thin provisioning, a virtual volume(s) is presented to a host system. If the host system makes write access to the virtual volume, it allocates a physical storage area for actually storing the data to the virtual volume. As a result, a volume(s) whose capacity is larger than that of the storage areas in the storage apparatus can be presented to the host system, and the storages areas in the storage apparatus can be used very efficiently.

One or more HDDs (Hard Disk Drives) constitute one RAID (Redundant Arrays of Independent Disks) group, and one or more logical volumes are defined in storage areas provided by one RAID group. Also, one or more RAID groups constitute one storage pool and each storage pool is associated with one or more virtual volumes. If write access is made from the host system to a virtual volume, a storage area in a unit(s) of a predetermined size (the storage area of this size will be hereinafter referred to as the page) is allocated from any of the logical volumes in a storage pool, which is associated with the relevant volume, to the relevant segment of the virtual volume which has been write-accessed.

In this case, by means of the conventional thin provisioning, pages may be allocated equally from a plurality of RAID groups constituting pool volumes in order of access to the virtual volume when allocating pages to the relevant segment of the virtual volume. Consequently, data is stored in a plurality of HDDs equally by allocating pages equally from the plurality of RAID groups. In this way, an attempt is made to reduce response time for write access from the host system and enhance access performance.

CITATION LIST

Patent Literature

PTL 1: Japanese Patent Laid-Open (Kokai) Application Publication No. 2008-282382

SUMMARY OF INVENTION

Technical Problem

However, if the above-described conventional page allocation method is used, data will be stored randomly in the plurality of RAID groups. Therefore, when backing up the data for each virtual volume to, for example, tape storage media, it is necessary to access each of the RAID groups, from which pages have been allocated to each segment of the virtual volumes, and read the data from each of the RAID groups. As a result, data access may be delayed during data transfer to the tape storage media or access conflicts to the RAID groups may occur, thereby causing a problem of degradation of data transfer performance.

The present invention was devised in light of the circumstances described above and aims at providing a storage apparatus and storage management method capable of enhancing the performance to transfer data to tape storage media in thin provisioning.

Solution to Problem

In order to solve the problem described above, a storage apparatus connected via a network to a host system requesting writing of data and to a tape management apparatus for managing tape storage media for storing the data is provided according to this invention. The storage apparatus includes: a storage unit for storing data, for which a write request is issued by the host system, in a virtual volume; and an allocation unit for allocating a predetermined area in a plurality of storage devices to a data storage area in the virtual volume in which the data is stored by the storage unit. The storage apparatus is characterized in that if the virtual volume is a backup object to be backed up to the tape storage media, the allocation unit allocates a predetermined area in a specified storage device, from among the plurality of storage devices, to the data storage area in the virtual volume; and if the virtual volume is not a backup object to be backed up to the tape storage media, the allocation unit allocates a predetermined area in an unspecified storage device, from among the plurality of storage devices, to the data storage area in the virtual volume.

According to the above-described configuration, the storage apparatus stores data, for which a write request is issued from the host system, in a virtual volume; and allocates a predetermined area in a plurality of storage devices to a data storage area in the virtual volume storing the data. If the virtual volume is a backup object to be backed up to the tape storage media, the storage apparatus allocates a predetermined area in a specified storage device, from among the plurality of storage devices, to the data storage area in the virtual volume; and if the virtual volume is not a backup object to be backed up to the tape storage media, the storage apparatus allocates a predetermined area in an unspecified storage device, from among the plurality of storage devices, to the data storage area in the virtual volume. Therefore, when backing up the data stored in the virtual volume to the tape storage media, it is unnecessary to access the unspecified storage device at the same time. So, the occurrence of access conflicts to the storage devices will be reduced.

Advantageous Effects of Invention

The present invention can enhance the performance to transfer data to external storage media in thin provisioning.

BRIEF DESCRIPTION OF DRAWINGS

FIG. 7 is an explanatory diagram explaining the content of a virtual volume management table according to the embodiment.

FIG. 8 is an explanatory diagram explaining the content of a pool volume management table according to the embodiment.

FIG. 9 is an explanatory diagram explaining the content of a page allocation management table according to the embodiment.

DESCRIPTION OF EMBODIMENTS

An embodiment of this invention will be explained with reference to the attached drawings.

1. Hardware Configuration of Computer System

Figure 1:
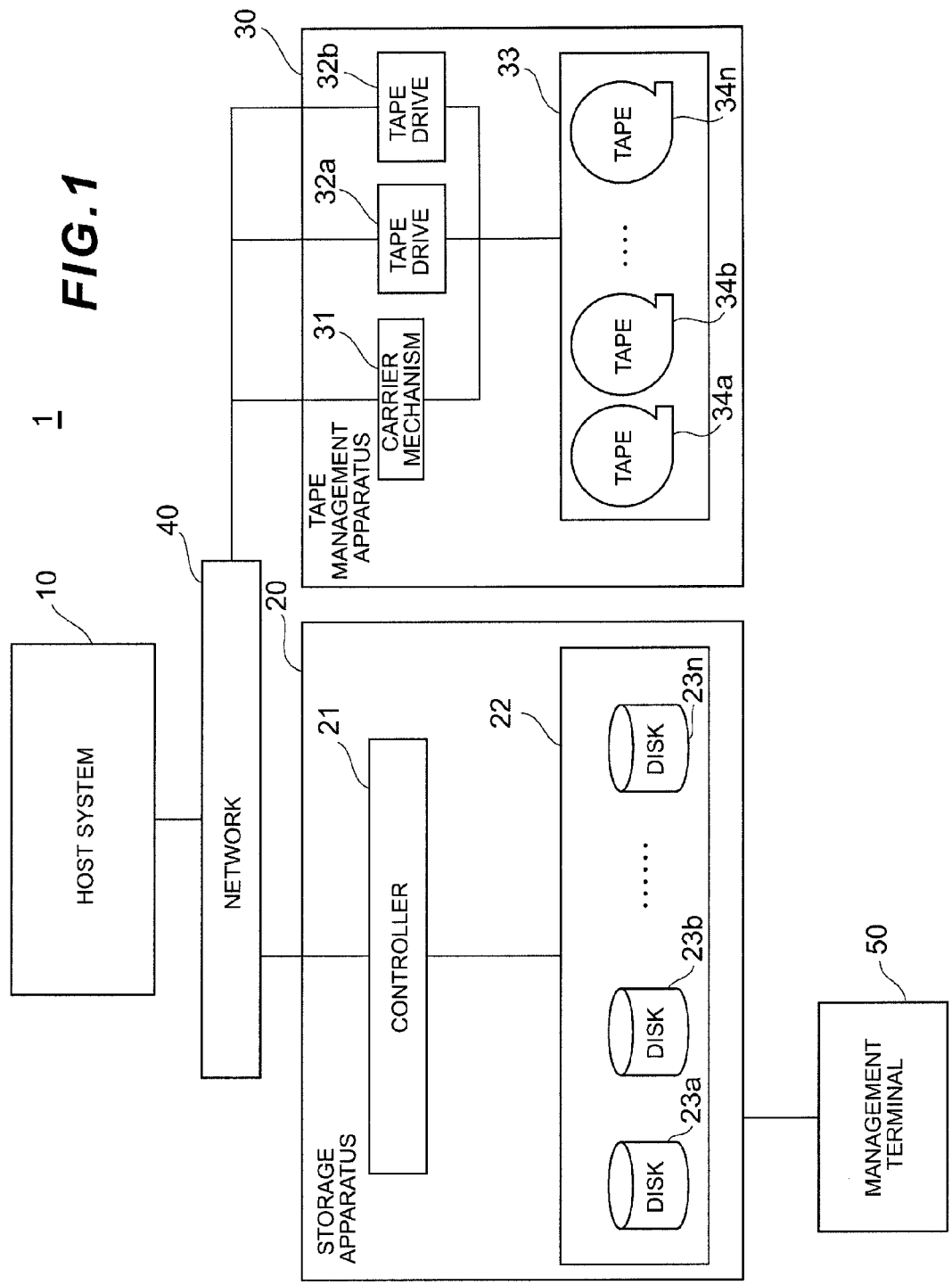
FIG. 1 is a block diagram showing the overall configuration of a computer system according to an embodiment of this invention.

The hardware configuration of a computer system 1 according to this embodiment will be firstly explained with reference to FIG. 1. As shown in FIG. 1, the computer system 1 according to this embodiment includes a host system 10, a storage apparatus 20, a tape management apparatus 30, a network 40, and a management terminal 50. The host system 10 and the tape management apparatus 30 are connected via the network 40 to the storage apparatus 20.

The host system 10 is a computer system equipped with information resources such as a CPU (Central Processing Unit) and a memory and is composed of, for example, a personal computer, a workstation, or a mainframe. The CPU serves as a processor controller and controls the operation of the entire host system 10 according to, for example, programs and operational parameters stored in the memory. Main programs stored in the memory will be explained later in detail. The host system 10 may also include information input devices such as a keyboard, switch, pointing device, and microphone, and information output devices such as a monitor display and speaker.

The storage apparatus 20 includes, for example, a controller 21 and a storage device group 22. The controller 21 includes information processing resources such as a CPU and a memory. The CPU serves as a processor controller in the same manner as described above and controls the operation of the entire storage apparatus 20 according to, for example, programs and operational parameters stored in the memory. Main programs stored in the memory will be explained later in detail.

The storage device group 22 is constituted from a plurality of HDDs 23a, 23b, and so on to 23n (hereinafter sometimes simply referred to as the disk(s) 23). The storage devices 22 may be composed of a plurality of hard disk drives including, for example, expensive hard disk drives such as FC (Fibre Channel) disks or inexpensive hard disk drives such as SATA (Serial AT Attachment) disks.

The tape management apparatus 30 includes a CPU (not shown in the drawing) for controlling a carrier mechanism 31 for carrying tape storage media 34a, 34b, and so on to 34n (hereinafter sometimes referred to the tape storage media 34) which constitute an external storage device 33, a memory (not shown in the drawing) for storing a control program for controlling the carrier mechanism 31, the carrier mechanism 31, tape drives 32a, 32b (hereinafter sometimes referred to as the tape drive(s) 32), and the external storage device 33. The tape management apparatus 30 stores data, which has been transferred from the storage apparatus 20, in the external storage device 33 (the tape storage media 34) under the control of the storage apparatus 20 in response to a request from the host system 10.

The network 40 connects the host system 10, the storage apparatus 20, and the tape management apparatus 30 each other and is composed of, for example, a SAN (Storage Area Network). In this case, communication between the devices is performed according to Fibre Channel Protocol.

The network 40 may be a LAN (Local Area Network), the Internet, public lines or private lines. If the network 40 is a LAN, communication is performed according to TCP/IP (Transmission Control Protocol/Internet Protocol) protocol.

The management terminal 50 is a computer device equipped with information processing resources such as a CPU and a memory and manages the disk, etc. of the storage apparatus 20 in accordance with input by, for example, an operator. The management terminal 50 is connected to the storage apparatus 20 via a LAN or similar and is composed of, for example, a personal computer.

2. Software Configuration of Computer System

Next, the main software configuration of each of the devices constituting the computer system 1 will be explained with reference to FIG. 2. Particularly, an example of programs stored in the memories for the host system 10 and the storage apparatus 20 will be explained with reference to FIG. 2.

Figure 2:
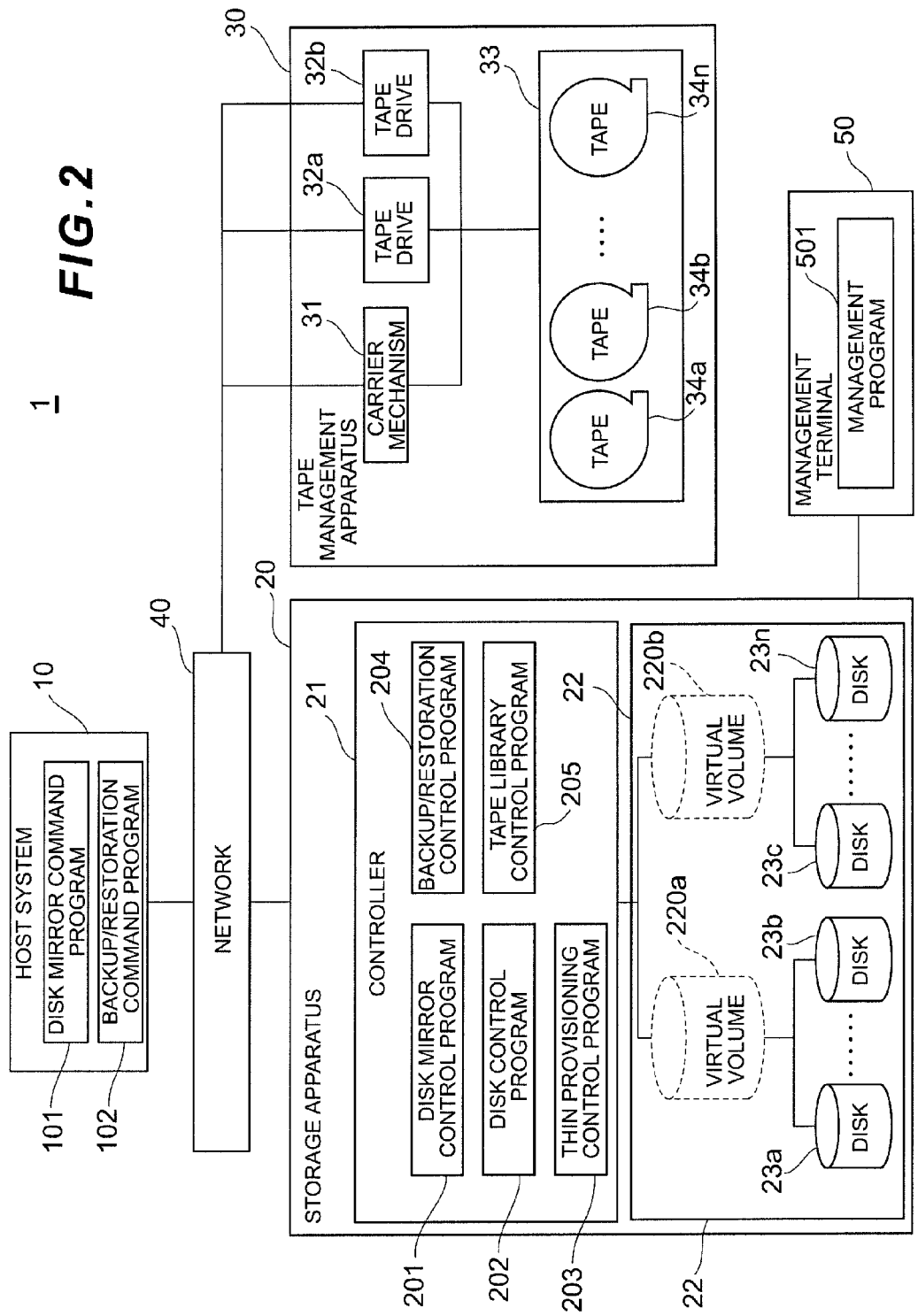
FIG. 2 is a block diagram showing the software configuration of each device of the computer system according to the embodiment.

As shown in FIG. 2, the memory for the host system 10 stores, for example, a disk mirror command program 101 and a backup/restoration command program 102. These programs area executed by the CPU for the host system 10. The disk mirror command program 101 is a program for giving a command to the storage apparatus 20 to multiplex data (or to duplicate data). In this embodiment, the disk mirror command program 101 gives a command to the storage apparatus 20 to form a pair of virtual volumes 220a, 220b (hereinafter referred to as the copy pair) to duplicate data by implementing a copy function (hereinafter referred to as the shadow image function) within the same storage apparatus or to separate the copy pair in order to staticize the data and execute a backup.

The backup/restoration command program 102 gives a command to the tape management apparatus 30 to back up data, that is, to copy data stored in the secondary virtual volume 220b, from among the virtual volumes 220a, 220b constituting the above-described copy pair, to the tape storage media 34 included in the tape management apparatus 30.

Also, the backup/restoration command program 102 gives a command to the tape management apparatus 30 to restore the virtual volume 220b, in which a failure occurs, from the data stored in the tape storage media 34.

Furthermore, the memory for the storage apparatus 20 stores, for example, a disk mirror control program 201, a disk control program 202, a thin provisioning control program 203, a backup/restoration control program 204, and a tape library control program 205 as shown in FIG. 2. These programs are executed by the aforementioned CPU for the storage apparatus 20.

The thin provisioning control program 203 is a program for executing processing for virtualizing storage areas. Specifically speaking, the thin provisioning control program 203 executes processing for: generating the virtual volumes 220a, 220b, which actually do not have storage areas; presenting some virtual volume 220a to the host system 10; and, if write access is made to that virtual volume from the host system 10, allocating a physical storage area for actually storing data to the virtual volume 220a (hereinafter referred to as the thin provisioning processing).

When copying data written to the virtual volume 220a (hereinafter sometimes referred to as the primary virtual volume), which is presented to the host system 10, to the virtual volume 220b (hereinafter sometimes referred to as the secondary virtual volume) which is set to form the copy pair with the primary virtual volume 220a, the thin provisioning control program 203 allocates a storage area to the relevant area in the secondary virtual volume 220b.

Figure 3:
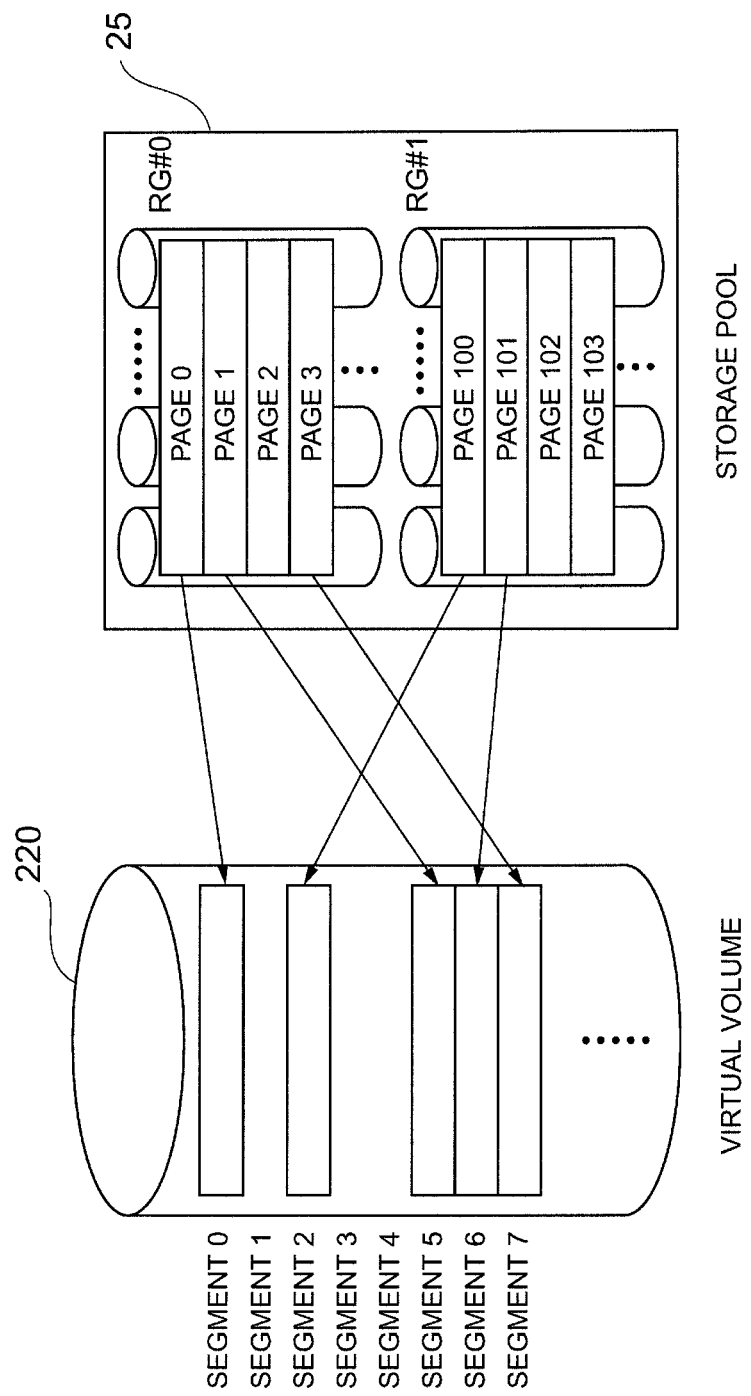
FIG. 3 is an explanatory diagram explaining page allocation processing according to the embodiment.

The outline of a thin provisioning function mounted in the storage apparatus 20 according to this embodiment will be explained with reference to FIG. 3. FIG. 3 shows the outline of the thin provisioning function mounted in the storage apparatus 20. In the storage apparatus 20, one or more HDDs 23 constitute one RAID group and one or more logical volumes (not shown in the drawing) are defined in a storage area(s) provided by one RAID group. The logical volumes provided by a plurality of RAID groups are managed as one pool volume. If write access is made from the host system 10 to the virtual volume 220, a storage area is allocated on a page basis from the logical volumes in a pool volume associated with the virtual volume 220 and write object data is stored in the relevant page(s).

For example, if data is stored in segment 0 of the virtual volume 220 as shown in FIG. 3, page 0 of a RAID group RG #0 is allocated to the segment 0. If data is stored in segment 2 of the virtual volume 220, page 100 of a RAID group RG #1 is allocated to the segment 2. In this way, the thin provisioning control program 203 allocates pages sequentially from the plurality of RAID groups in order to enhance data access performance from the host system 10.

Referring back to FIG. 2, the disk mirror control program 201 is a program for controlling disk mirror processing in accordance with a command from the host system 10. The disk mirror processing is processing for duplicating data or separating a copy pair in order to staticize the data and executes a backup, using the aforementioned shadow image function. Specifically speaking, when data is written to the primary virtual volume 220a, the disk mirror control program 201 controls the disk control program 202 so that the data will be copied synchronously or asynchronously to the secondary virtual volume 220b which is set to form a copy pair with the primary virtual volume 220a.

The disk control program 202 is a program for controlling each HDD mounted in the storage apparatus 20 and controls reading or writing data, which is read/written to the virtual volume 220, from or to the relevant HDD 23, using the thin provisioning function, the disk mirror function, or the backup/restoration function described earlier.

Figure 4:
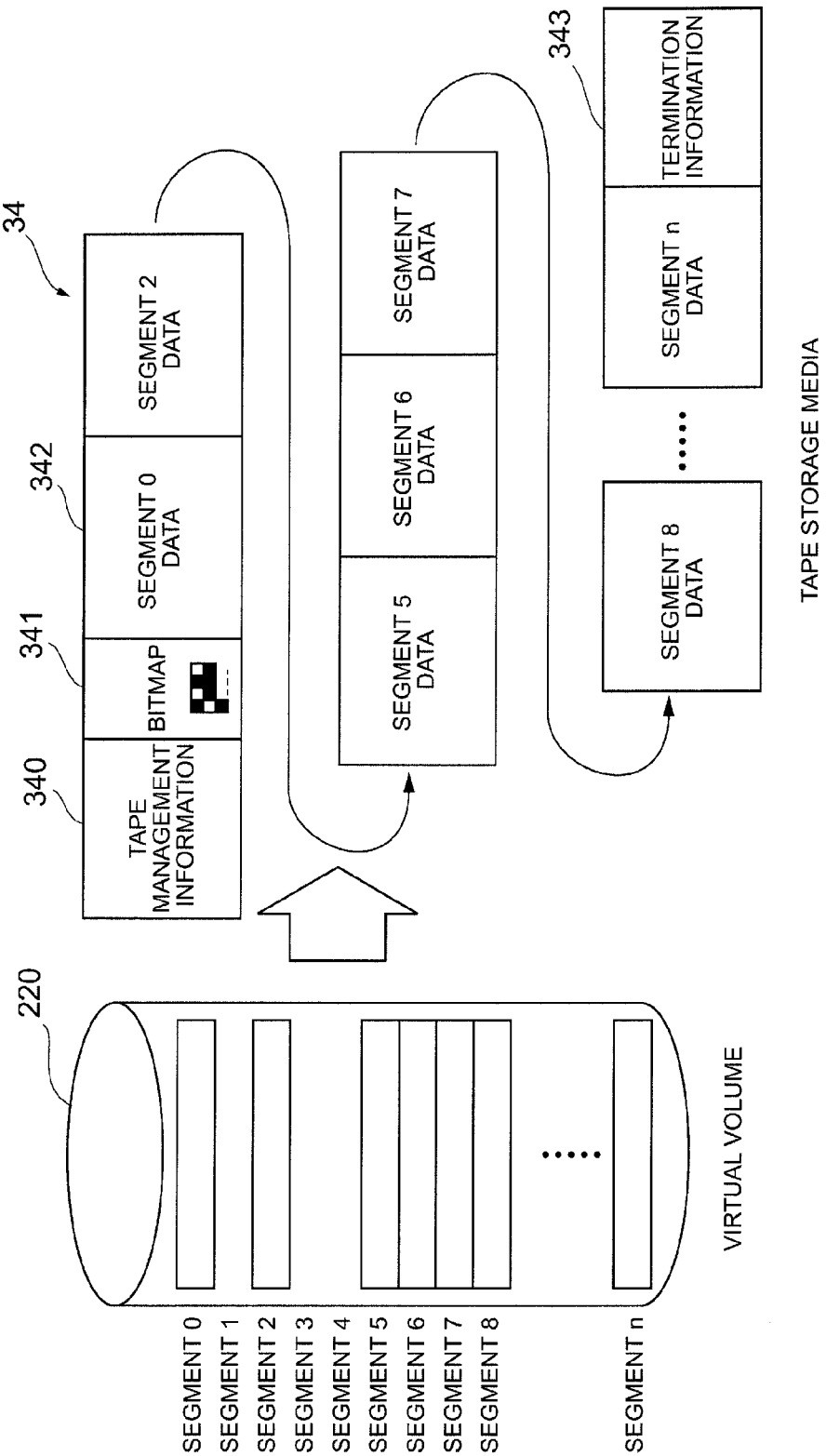
FIG. 4 is an explanatory diagram explaining a data format of a tape storage medium according to the embodiment.

The backup/restoration control program 204 copies the data, which is stored in the secondary virtual volume, to the tape storage media 34 in the tape management apparatus 30 and executes processing for backing up the data. A data format of the tape storage media 34 to which the data stored in the secondary virtual volume is copied will be explained with reference to FIG. 4. FIG. 4 is an explanatory diagram explaining the data format of the tape storage media 34.

As shown in FIG. 4, the data format of the tape storage media 34 includes, for example, tape management information 340, a bitmap 341, data storage areas 342, and termination information 343. The tape management information 340 stores information about data stored in the tape storage media 34 and includes, for example, the name of the tape storage media 34, data backup start date and time, the number of stored volumes which are backup object virtual volume(s), volume number, volume size, and bitmap size.

The bitmap 341 stores data storage areas of the virtual volume 220 which is a backup object. It is possible to recognize which segment of the backup object virtual volume 220 stores the relevant data, according to the bitmap 341. The data storage areas 342 store backup data of the virtual volume 220. If data is stored in segment 0, segment 2, segment 5, segment 6, and segment 7 of the virtual volume 220 as shown in FIG. 4, the segment 0 data, the segment 2 data, the segment 5 data, the segment 6 data, and the segment 7 data are stored in sequential order in the data storage areas 342.

The termination information 343 stores a backup termination date and time and the number of stored volumes which are stored in the tape storage media 34.

In this way, the backup/restoration control program 204 backs up data on a virtual volume basis. As described above, the data stored in the virtual volume 220 is actually stored in the relevant page(s) in the pool volume. Therefore, the backup/restoration control program 204 reads the data stored in the relevant page allocated to each segment of the virtual volume 220 and transfers it to the tape management apparatus 30.

The memory for the management terminal 50 stores, for example, a management program 501. In response to input by, for example, the operator, the CPU for the management terminal 50 executes the management program 501. The management program 501 is a program for managing, for example, disks in the storage apparatus 20. For example, the management program 501 manages association between the virtual volumes and the pool volumes and virtual volume pair setting. Furthermore, the management program 501 executes, for example, an update of data tables described later depending on whether or not the virtual volume is accessed only by the host system 10, or whether or not the virtual volume is a backup object to be backed up to the tape storage media 34.

Figure 5:
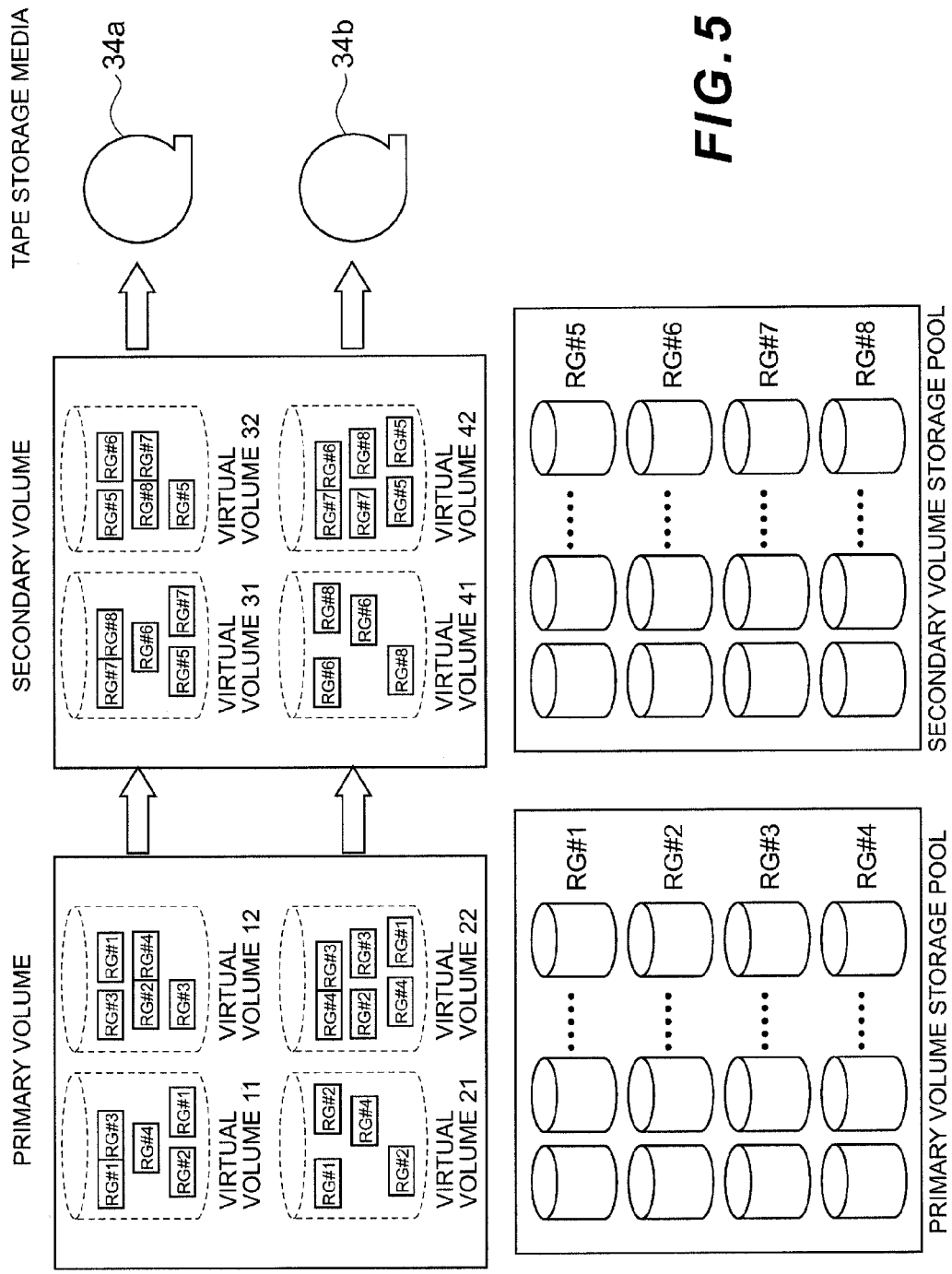
FIG. 5 is an explanatory diagram explaining conventional page allocation.
Figure 6:
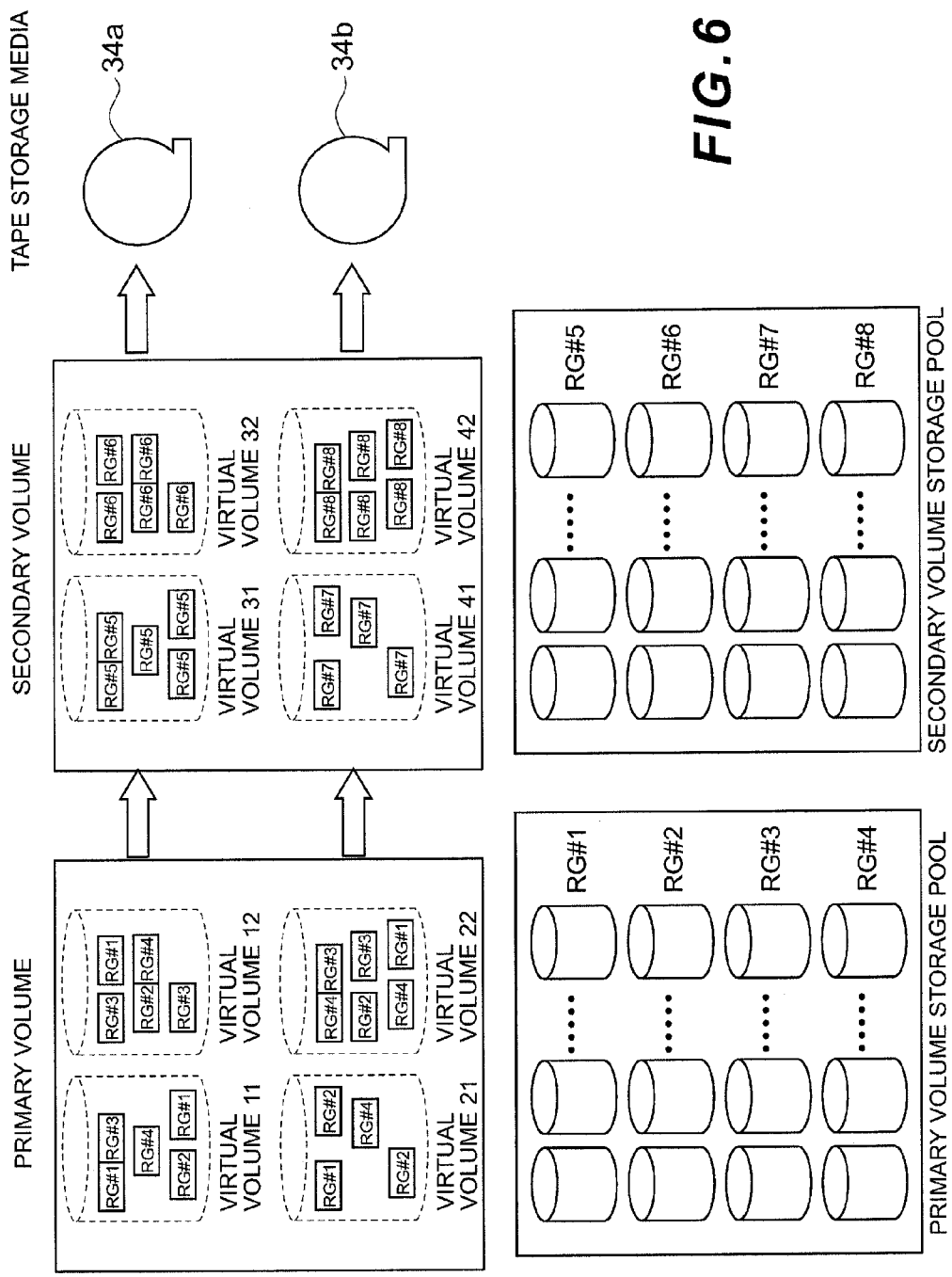
FIG. 6 is an explanatory diagram explaining page allocation according to an embodiment of the invention.

A method executed by the thin provisioning control program 203 for allocating a page(s) to the secondary virtual volume will be explained with reference to FIG. 5 and FIG. 6. FIG. 5 is an explanatory diagram explaining a conventional page allocation method. FIG. 6 is an explanatory diagram explaining a page allocation method according to this embodiment.

Incidentally, in the following explanation, virtual volumes 11, 12, 21, 22 exist as primary virtual volumes for the disk mirror processing described earlier and a first storage pool constituted from logical volumes created in RAID groups RG #1 to RG #4, respectively, is associated with the above-mentioned primary virtual volumes. Also, virtual volume 31, 32, 41, 42 exist as secondary virtual volumes for the disk mirror processing and a second storage pool constituted from logical volumes created in RAID groups RG #5 to RG #8, respectively, is associated with the above-mentioned secondary virtual volumes.

Therefore, if write access is made from the host system 10 to a primary virtual volume in the examples shown in FIG. 5 and FIG. 6, a necessary amount of storage area is allocated on a page basis from any of the logical volumes in the first storage pool to the relevant primary virtual volume. If the data is copied to a secondary virtual volume, a necessary amount of storage area is allocated on a page basis from any of the logical volumes in the second storage pool to the relevant second virtual volume.

If the conventional page allocation method shown in FIG. 5 is used in the above-described case when the host system 10 writes data to the primary virtual volume and pages are allocated from the first storage pool for the primary virtual volumes to the relevant segment of the primary virtual volume, the pages are allocated in sequential order from each of the RAID groups constituting the first storage pool. For example, pages are allocated sequentially from the RAID groups RG #1, RG #2, RG #3, RG #4, which constitute the storage pool for the primary virtual volumes, to the write area in the virtual volume 11 which is the primary virtual volume. In this way, data access performance from the host system 10 is enhanced by reducing response time for data access from the host system 10 by sequentially allocating pages from the plurality of RAID groups.

When pages are allocated from the second storage pool to the relevant segment of the secondary virtual volume in order to copy data, which is stored in the primary virtual volume, to the secondary virtual volume by the conventional page allocation method, pages are allocated sequentially from each of the RAID groups constituting the second storage pool. For example, as shown in FIG. 5, arbitrary pages are allocated sequentially from the RAID groups RG #5, RG #6, RG #7, RG #8, which constitute the second storage pool, to write areas in the virtual volumes 31, 32, 41, 42 which are the secondary virtual volumes.

Pages are allocated randomly from each of the RAID groups constituting the first or second storage pool corresponding to the primary virtual volume and the secondary virtual volume by the conventional page allocation method as described above in consideration of the data access performance from the host system 10. Accordingly, if data stored in the secondary virtual volume is to be stored in the tape storage media, it is necessary to access the plurality of RAID groups, thereby causing a problem of degradation of the data transfer performance. Moreover, when data is to be backed up from a plurality of secondary virtual volumes to a plurality of tape storage media, it is sometimes necessary to access the plurality of RAID groups at the same time, thereby causing problems of the occurrence of RAID group conflicts and degradation of the data transfer performance.

Therefore, according to this embodiment, if data stored in the secondary virtual volume is a data backup object to be backed up to the tape storage media, pages are not allocated sequentially from each of the RAID groups, which constitute the second storage pool associated with the secondary virtual volume, to the relevant segment of the secondary virtual volume, but arbitrary pages are allocated from a specified RAID group. For example, as shown in FIG. 6, pages are allocated only from the RAID group #5 constituting the second storage pool to the secondary virtual volume 31 and pages are allocated only from the RAID group #6 constituting the second storage pool to the secondary virtual volume 32.

As a result, when backing up the data stored in the secondary virtual volume 31 and the secondary virtual volume 32 to the tape storage media 34a, it is no longer necessary to access the plurality of RAID groups constituting the second storage pool. In other words, when copying the data stored in the secondary virtual volume 31 to the tape storage media 34a, it is only necessary to access the RAID group #5; and when copying the data stored in the secondary virtual volume 32 to the tape storage media 34a, it is only necessary to access the RAID group #6.

However, with regard to the primary virtual volume, pages are allocated sequentially from each of the RAID groups constituting the first storage pool according to this embodiment. As a result, it is possible to maintain the access performance from the host system 10 to the virtual volume and prevent degradation of the performance at the time of a data backup to the tape storage media.

(Conventional Problems and Solutions for Restoration)

If a failure or similar occurs in a disk 23, the backup/restoration control program 204 executes data restoration, using the tape storage media 34. When restoring data in the tape storage media 34 to the secondary virtual volume, the backup/restoration control program 204 executes the page allocation processing in the same manner as the data backup. Specifically speaking, if the secondary virtual volume which is an object to be restored is a data backup object to be backed up to the tape storage media 34, pages are allocated not sequentially from each of the RAID groups, but from a specified RAID group, to a write area in the virtual volume.

Furthermore, if the secondary virtual volume which is an object to be restored is not a data backup object to be backed up to the tape storage media 34, that is, when pages are allocated sequentially from each of the RAID groups, it is possible to execute data restoration at a high speed by considering continuity in the bitmap 341 stored in the tape storage media 34.

Specifically speaking, continuity in the bitmap 341 of the tape storage media 34 is judged and the same RAID group is selected to allocate pages to consecutive areas. When selecting the same RAID group to allocate pages, a least common multiple of the amount of data that can be transferred within average response time of the tape management apparatus 30 relative to the host system 10 and the striping size of the RAID group may be used as a threshold for data transfer. The average response time of the tape management apparatus 30 relative to the host system 10 can be maximum occupation time of the RAID group used for data transfer from the tape storage media 34. The striping size of the RAID group is a value obtained by multiplying the block size of the disk 23 by the number of the disks 23 in the RAID group.

The amount of data that can be transferred within the average response time of the tape management apparatus 30 relative to the host system 10 is a value obtained by multiplying the average response time by a speed of data transfer from the tape storage media 34. For example, assuming that the data transfer speed of the tape storage media 34 by the tape management apparatus 30 is 240 MB/S and the average response time of the tape management apparatus 30 relative to the host system 10 is 5 to 10 ms, the amount of data which can be transferred from the tape storage media 34 within the average response time 5 ms is 1.2 MB and the amount of data which can be transferred from the tape storage media 34 within the average response time 10 ms is 2.4 MB.

Therefore, the least common multiple of the amount of data ranging from 1.2 MB to 2.4 MB and the striping size of the RAID group can be set as a data transfer threshold for data restoration. For example, the data transfer threshold for each different striping size of the RAID group can be obtained as listed below. If the least common multiple exceeds 2.4 MB, the data transfer threshold shown below is set as 2.4 MB; and if the least common multiple is less than 1.2 MB, the striping size is multiplied by n so that the threshold will be within the range of 1.2 MB to 2.4 MB.

Disk Block Size×Number of Disks in RAID Group=Striping Size→Threshold

512 KB×1=512 KB→2.0 MB

512 KB×2=1.0 MB→2.0 MB

512 KB×3=1.5 MB→1.5 MB

512 KB×4=2.0 MB→2.0 MB

512 KB×5=2.5 MB→2.4 MB

512 KB×6=3.0 MB→2.4 MB [Math. 1]

In this way, it is possible according to this embodiment to achieve high-speed restoration by judging the continuity in the bitmap stored in the tape storage media at the time of restoration and allocating pages from the same RAID group to consecutive areas.

3. Details of Functions of Storage Apparatus

Next, specific functions of the storage apparatus 20 will be explained with reference to FIG. 7 to FIG. 9. FIG. 7 to FIG. 9 are tables to which reference is made when explaining the specific functions of the storage apparatus 20. These tables are stored in the memory for the storage apparatus 20.

When data is written by the host system 10 as described above, the storage apparatus 20 allocates an arbitrary page(s) from the storage pool to the relevant segment of the virtual volume. The storage apparatus 20 manages which page of which storage pool is allocated to which volume of the virtual volumes, using a virtual volume management table 250 described below.

Now, the content of the virtual volume management table 250 for managing the virtual volumes will be explained with reference to FIG. 7. FIG. 7 is an explanatory diagram explaining the content of the virtual volume management table 250. As shown in FIG. 7, the virtual volume management table 250 includes, for example, a volume number column 251, a segment number column 252, a whether-allocated-or-not column 253, a pool number column 254, and a page number column 255. The volume number column 251 stores the number for identifying each virtual volume. The segment number column 252 stores the number for identifying a plurality of segments constituting each volume of the virtual volumes.

The whether-allocated-or-not column 253 stores information for identifying whether or not a page is allocated to each segment (NO/YES). If a page of the pool volume is not allocated, the whether-allocated-or-not column 253 stores NO. If data is written from the host system 10 to an arbitrary segment and an arbitrary page is allocated from the pool volume, the whether-allocated-or-not column 253 stores YES.

The pool number column 254 stores the number for identifying a pool volume allocated to each segment. The page number column 255 stores the number for identifying a page which is a storage area in the pool volume allocated to each segment. If the storage apparatus 20 allocates a page in the pool volume to any of the virtual volumes, it adds and updates each piece of data stored in the virtual volume management table 250.

If the host system 10 issues a data read request to the storage apparatus 20 to read data stored in the virtual volume, the storage apparatus 20 transfers the data, for which the read request is made, to the host system 10. The storage apparatus 20 refers to the above-described virtual volume management table 250 and reads the relevant page of the pool volume corresponding to the relevant segment of the virtual volume for which the read request is made.

Furthermore, the storage apparatus 20 manages, for example, the correspondence relationship between the plurality of RAID groups and the pool volumes and the number of remaining pages in each RAID group, using a pool volume management table 260 described below. When allocating a page(s) to a write area in the virtual volume, the storage apparatus 20 refers to the pool volume management table 260 and allocates a page(s) of the pool volume to the virtual volume.

Now, the pool volume management table 260 will be explained with reference to FIG. 8. FIG. 8 is an explanatory diagram explaining the content of the pool volume management table 260. As shown in FIG. 8, the pool volume management table 260 includes a pool number column 261, a RAID group number column 262, a numberof-remaining-pages column 263, and a number-of-D2T-transfer-object-volumes column 264.

The pool number column 261 stores the number for identifying a pool volume. The RAID group number column 262 stores the number for identifying a RAID group constituted from a plurality of disks. The number-of-remaining-pages column 263 stores the number of remaining pages in each RAID group. The number of remaining pages means the number of pages in which data is not stored yet. The numberof-D2T-transfer-object-volumes column 264 stores information indicating the number of virtual volume(s) which is a transfer object(s), from among the virtual volumes to which each RAID group is allocated.

When allocating a page(s) to a write area in the virtual volume, the storage apparatus 20 allocates a page from a RAID group with a small number of volumes from among the data stored in the number-of-D2T-transfer-object-volumes column 264, or a page from a RAID group with a large number of pages from among the data stored in the number-of-remaining-pages column 263.

If the virtual volume is a backup object volume to be backed up to the tape storage media, it is possible to enhance the performance to transfer data to the tape management apparatus 30 by allocating a page(s) of a RAID group with a small number of volumes in the number-of-D2T-transfer-object-volumes column 264. If the virtual volume is a backup object volume to be backed up to the tape storage media, it is possible to allocate a page(s) from one RAID group to one virtual volume by allocating the RAID group with a large number of pages in the numberof-remaining-pages column 263.

Furthermore, the storage apparatus 20 manages a page allocation method for each virtual volume, using a page allocation management table 270 described below. Examples of the page allocation method can include a normal page allocation method of allocating pages equally from a plurality of RAID groups to the virtual volume and a D2T page allocation method of allocating pages from a fixed RAID group to the virtual volume.

Now, the page allocation management table 270 will be explained with reference to FIG. 9. FIG. 9 is an explanatory diagram explaining the content of the page allocation management table 270. As shown in FIG. 9, the page allocation management table 270 includes a volume number column 271, a page allocation method column 272, and an allocating RAID group number column 273.

The volume number column 271 stores the number for identifying each virtual volume in the same manner as the volume number column 251 in the virtual volume management table 250. The page allocation method column 272 stores information indicating the page allocation method used to allocate a page(s) of the relevant RAID group. The normal allocation method or the D2T allocation method can be indicated as an example of the page allocation method.

The normal allocation method is to allocate pages sequentially from a plurality of RAID groups to the relevant segment of the virtual volume. For example, if data stored in the virtual volume is accessed by the host system 10, but it is not a backup object to be backed up to the tape storage media, the normal allocation method is set. The D2T allocation method is to allocate pages from a fixed RAID group to the relevant segment of the virtual volume. For example, if data stored in the virtual volume is not accessed by the host system 10 and is a backup object to be backed up to the tape storage media, the D2T allocation method is set. The information stored in the page allocation method column 272 is set by, for example, the operator via the management terminal 50 described earlier.

The allocating RAID group number column 273 stores the RAID group number designated when allocating pages from a fixed RAID group to each virtual volume. For example, in the page allocation management table 270, the page allocation method for the volume number 2 is set to D2T and the allocating RAID group number is set to 100. In this case, pages are allocated from only the RAID group whose RAID group number is 100.

When the storage apparatus 20 restores data by using the tape storage media 34 as described earlier, it allocates an arbitrary page(s) from the storage pool to the relevant segment of the virtual volume which is an object to be restored. When allocating an arbitrary page(s) of the storage pool to the virtual volume, the storage apparatus 20 executes the page allocation processing depending on whether or not the virtual volume is a backup object to be backed up to the tape storage media.

Whether the virtual volume is a backup object or not can be judged as described above by referring to the information stored in the page allocation method column 272 in the page allocation management table 270 shown in FIG. 9. If it is determined that the virtual volume which is an object to be restored is a backup object volume (D2T), the storage apparatus 20 allocates pages from a fixed RAID group to the virtual volume.

When a page(s) is allocated to the virtual volume from a RAID group, each piece of information stored in the whether-allocated-or-not column 253, the pool number column 254, and the page number column 256 associated with the relevant segment number 252 in the virtual volume management table 250 shown in FIG. 7. Specifically speaking, the information stored in the whether-allocated-or-not column 253 is updated to YES and data stored in the pool number column 254 and the page number column 256 are updated to the pool number and the page number which are allocated to each segment.

Furthermore, if the storage apparatus 20 refers to the page allocation management table 270 shown in FIG. 9 and determines that the virtual volume which is an object to be restored is not a backup object volume, the storage apparatus 20 allocates pages in consideration of the continuity in the bitmap 341 stored in the tape storage media 34. Specifically speaking, the storage apparatus 20 judges the continuity in the bitmap 341 in the tape storage media 34, selects the same RAID group for consecutive areas, and allocates pages from that same RAID group to the consecutive areas. When allocating pages from the same RAID group, a least common multiple of the data transfer unit to the tape management apparatus 30 and the striping size of the RAID group can be used as the allocation threshold as described earlier.

4. Details of Actions of Storage Apparatus

Next, the details of actions of the storage apparatus 20 will be explained with reference to FIG. 10 to FIG. 16. Firstly, the page allocation processing for a data backup by the storage apparatus 20 will be explained with reference to FIG. 10 to FIG. 12. Incidentally, the processing subject of various processing will be explained as a program in the following description. However, needless to say, the controller 21 for the storage apparatus 20 actually executes the processing according to that program.

Figure 10:
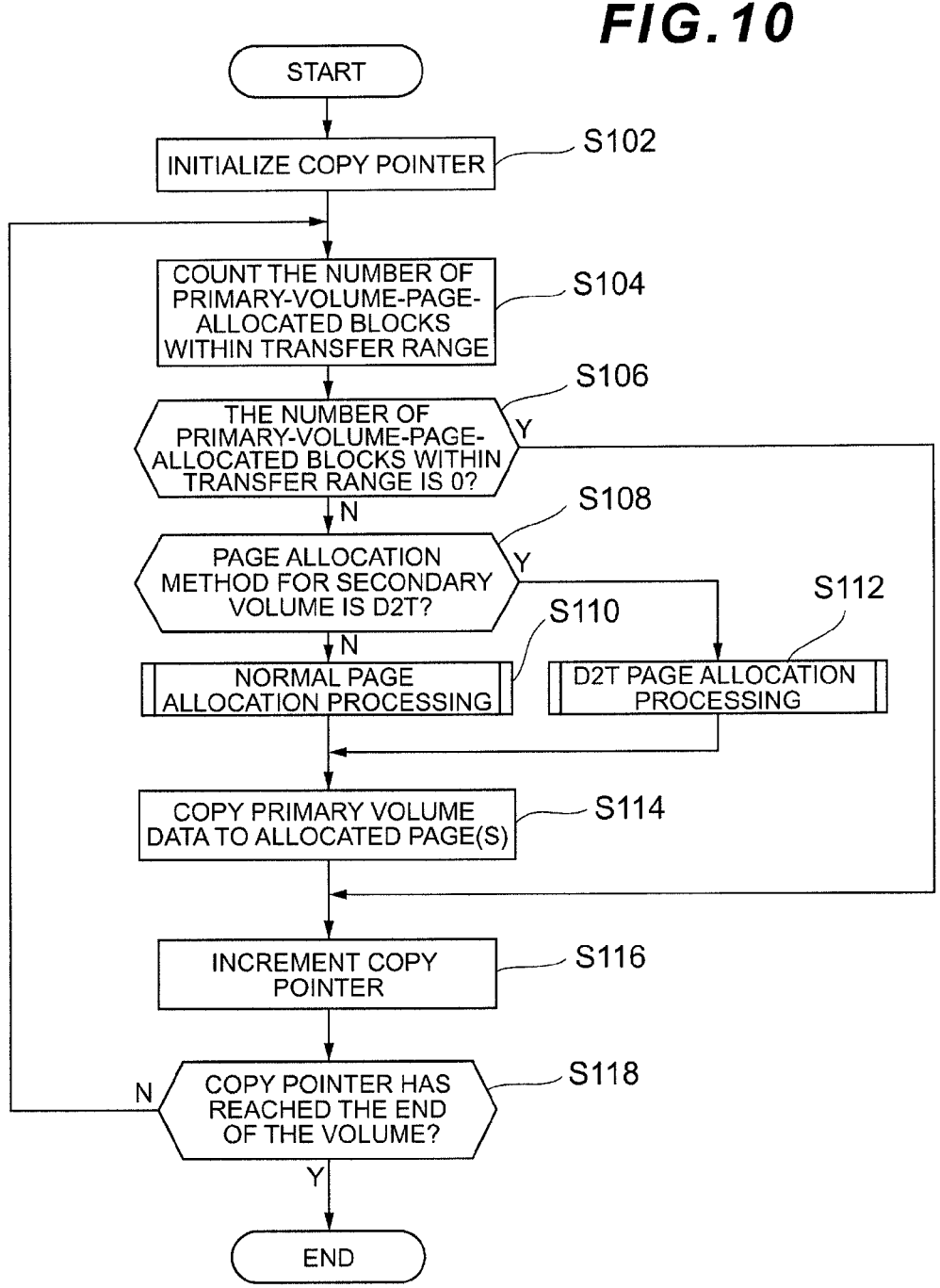
FIG. 10 is a flowchart illustrating data backup processing according to the embodiment.

FIG. 10 is a flowchart illustrating processing for judging the page allocation method for the data backup processing. As shown in FIG. 10, the backup/restoration control program 204 firstly initializes a copy pointer (S102). The copy pointer is a pointer indicating a specified position of the relevant virtual volume. The virtual volume is divided by the pointer into an arbitrary size. The backup/restoration control program 204 sequentially copies data stored in the virtual volume which is divided by the pointer.

Next, the backup/restoration control program 204 counts the number of page-allocated blocks of the virtual volume (primary virtual volume) which is a backup object within a transfer range (S104). The transfer range herein used means a specified range sectioned by the above-described pointer. The backup/restoration control program 204 can recognize whether or not data which is a backup object is stored within the transfer range, by counting the number of page-allocated blocks in step S104.

The backup/restoration control program 204 judges whether the number of page-allocated blocks of the primary virtual volume within the transfer range is 0 or not (S106). If it is determined in step S106 that the number of page-allocated blocks of the primary virtual volume within the transfer range is 0, the backup/restoration control program 204 executes processing in step S116 and subsequent steps described below.

If it is determined in step S106 that the number of page-allocated blocks of the primary virtual volume within the transfer range is not 0, the thin provisioning control program 203 then judges whether the page allocation method for the secondary virtual volume to which the relevant data is backed up is D2T or not (S108). In step S108, the thin provisioning control program 203 refers to the information stored in the page allocation method column 272 corresponding to the relevant volume in the page allocation management table 270 shown in FIG. 9 and then judges whether the allocation method is D2T or normal. The case where the allocation method is D2T is when the virtual volume is a backup object volume to be backed up to the tape storage media 34 as described earlier.

If it is judged in step S108 that the page allocation method for the virtual volume is normal, the thin provisioning control program 203 executes normal page allocation processing (S110). The normal page allocation processing executed in step S110 is processing for allocating arbitrary pages sequentially from the plurality of RAID groups. The normal page allocation processing in step S110 will be explained later in detail.

If it is determined in step S108 that the page allocation method for the virtual volume is D2T, the thin provisioning control program 203 executes D2T page allocation processing (S112). In step S112, pages are allocated from a fixed RAID group from among the plurality of RAID groups. The D2T page allocation processing in step S112 will be explained later in detail.

After executing the page allocation processing in step S110 or step S112, the backup/restoration control program 204 copies the data, which is stored in the pool volume allocated to the primary virtual volume, to the relevant page(s) of the pool volume allocated to the secondary virtual volume (S114). Then, the backup/restoration control program 204 increments the copy pointer and moves the pointer from the current copy range to the next copy range (S116).

The backup/restoration control program 204 judges whether the copy pointer has reached the end of the virtual volume (primary virtual volume) (S118). In step S118, whether the data backup to the secondary virtual volume has terminated or not is judged based on whether or not the copy pointer has reached the end of the primary virtual volume. If it is determined in step S118 that the copy pointer has reached the end of the primary virtual volume, the backup/restoration control program 204 terminates the processing. If it is determined in step S118 that the copy pointer has not reached the end of the primary virtual volume, the backup/restoration control program 204 repeats executing the processing in step S104 and subsequent steps.

Figure 11:
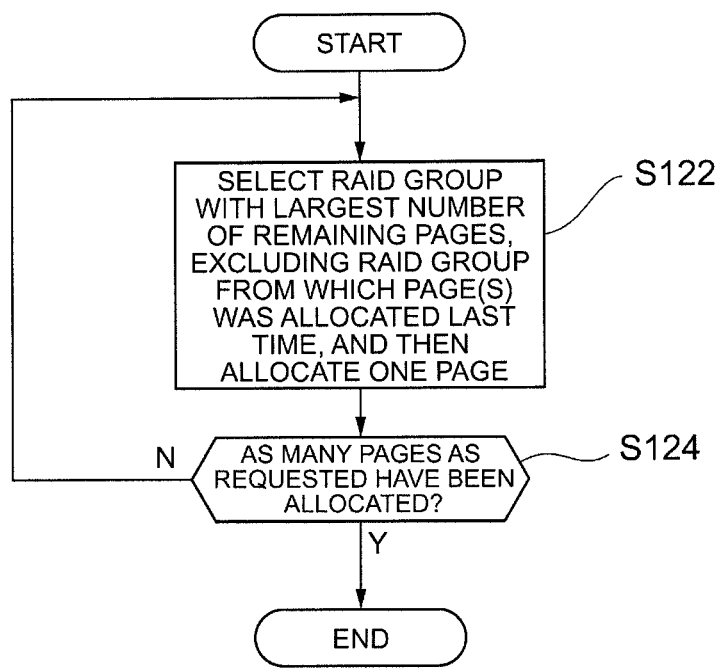
FIG. 11 is a flowchart illustrating the details of normal page allocation processing according to the embodiment.

Next, the details of the normal page allocation processing in step S100 of FIG. 10 will be explained with reference to FIG. 11. FIG. 11 is a flowchart illustrating the details of the normal page allocation processing. As shown in FIG. 11, the thin provisioning control program 203 selects a RAID group with the largest number of remaining pages, excluding the RAID group from which a page(s) was allocated last time; and then allocates one page from the selected RAID group to the secondary virtual volume (S122).

Subsequently, the thin provisioning control program 203 judges whether as many pages as requested by the host system 20 have been allocated or not (S124). If it is determined in step S124 that as many pages as requested have been allocated, the thin provisioning control program 203 terminates the processing. If it is determined in step S124 that as many pages as requested have not been allocated, the thin provisioning control program 203 repeats the processing in step S122.

Figure 12:
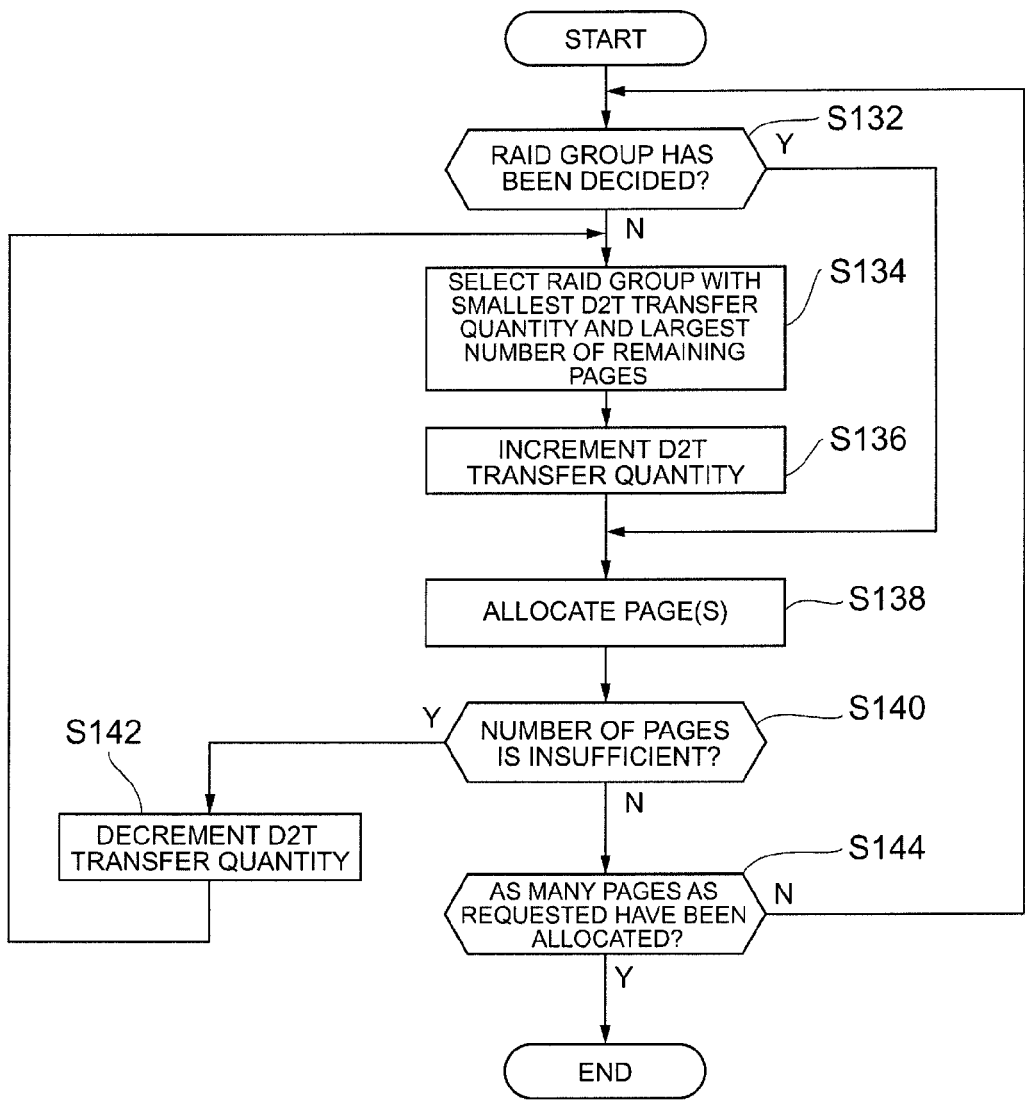
FIG. 12 is a flowchart illustrating the details of D2T page allocation processing according to the embodiment.

Next, the details of the D2T page allocation processing in step S112 of FIG. 10 will be explained with reference to FIG. 12. FIG. 12 is a flowchart illustrating the details of the D2T page allocation processing. As shown in FIG. 12, the thin provisioning control program 203 judges whether or not a fixed RAID group has been decided for the virtual volume which is a data write object (S132). In step S132, the thin provisioning control program 203 refers to the information stored in the allocating RAID group number column 273 for the relevant volume in the page allocation management table 270 shown in FIG. 9 and judges whether or not the fixed RAID group has been decided for the virtual volume which is the data write object.

If it is determined in step S132 that the RAID group has not been decided, the thin provisioning control program 203 selects a RAID group with a smallest D2T transfer quantity and with a largest number of remaining pages, from among the plurality of RAID groups (S134). In step S134, the thin provisioning control program 203 refers to the information stored in the D2T transfer quantity column 264 and the number-of-remaining-pages column 263 in the pool volume management table 260 shown in FIG. 8 and selects a RAID group which satisfies the above-described conditions.

If it is determined in step S132 that the RAID group has already been decided, the thin provisioning control program 203 executes processing in step S138 and subsequent steps described below. Then, the thin provisioning control program 203 increments the D2T transfer quantity 264 in the pool volume management table 260 shown in FIG. 8 (S136).

Subsequently, the thin provisioning control program 203 allocates a page(s) from the already selected RAID group or the RAID group selected in step S134 to a write area (segment) of the virtual volume which is the backup object (S138).

Next, the thin provisioning control program 203 judges whether the number of pages which need to be allocated to the write area (segment) of the virtual volume is insufficient or not (S140). If it is determined in step S140 that the number of pages is insufficient, the thin provisioning control program 203 decrements the D2T transfer quantity 264 in the pool volume management table 260.

If it is determined in step S140 that the number of pages is not insufficient, the thin provisioning control program 203 judges whether as many pages as requested by the host system 20 have been allocated or not (S144). If it is determined in step S144 that as many pages as requested have been allocated, the thin provisioning control program 203 terminates the processing. If it is determined in step S144 that as many pages as requested have not been allocated, the thin provisioning control program 203 repeats the processing in step S138 and subsequent steps.

If it is determined in step S140 that the number of pages is insufficient, the thin provisioning control program 203 decrements the D2T transfer quantity (S142), returns to the processing in step S204, and selects another RAID group that satisfies the conditions in step S134.

Figure 13:
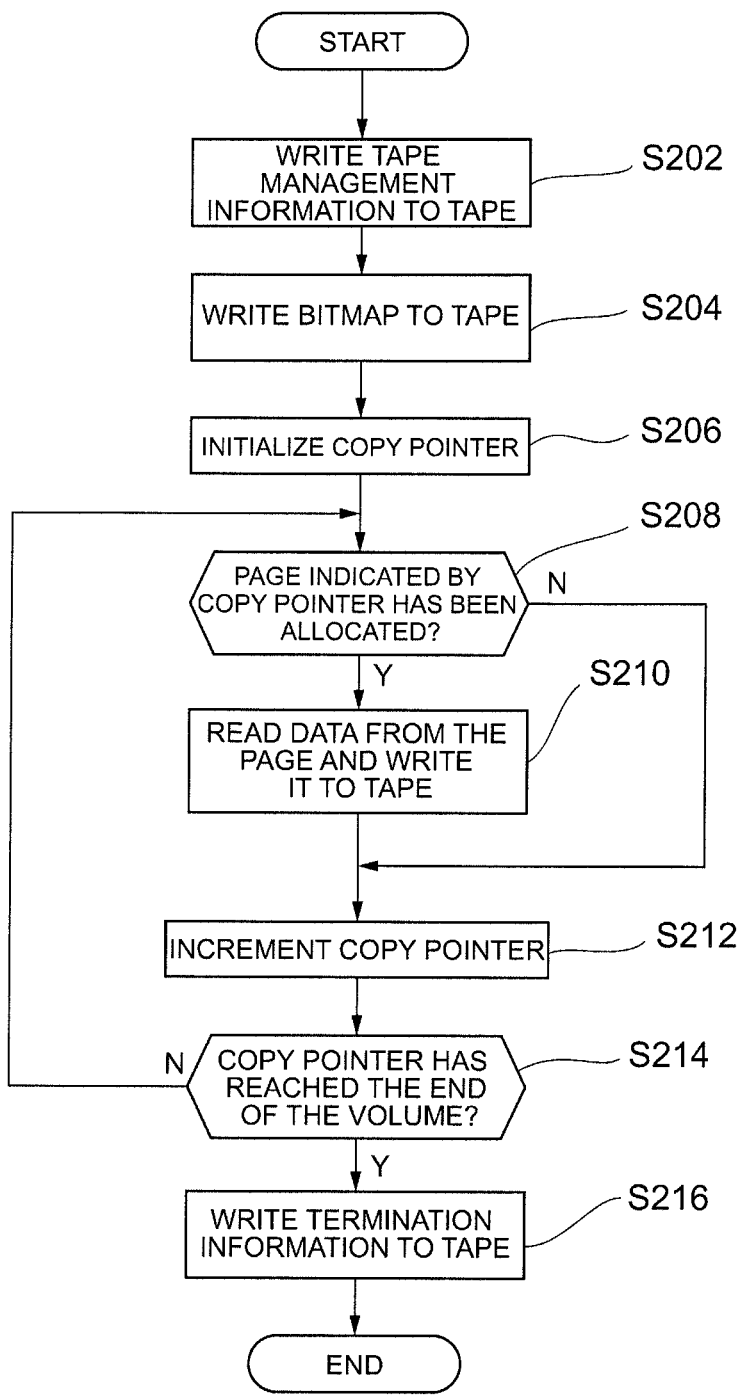
FIG. 13 is a flowchart illustrating processing for backing up data to tape storage media according to the embodiment.

Next, the processing for backing up data to the tape storage media 34 will be explained with reference to FIG. 13. As shown in FIG. 13, the backup/restoration control program 204 firstly writes the tape management information to a tape (tape storage media 34) of the tape management apparatus 30 (S202). Then, the backup/restoration control program 204 writes the bitmap to the tape storage media 34 to which the tape management information was written in step 202 (S204).

Subsequently, the backup/restoration control program 204 initializes a copy pointer for the virtual volume (secondary volume) which is a backup object to be backed up to the tape storage media 34 (S206). The backup/restoration control program 204 then judges whether a page indicated by the copy pointer has been allocated or not (S208). If it is determined in step S208 that the page indicated by the copy pointer has been allocated, the backup/restoration control program 204 reads data stored in the relevant page of the pool volume and writes the data to the tape storage media. If it is determined in step S208 that the page indicated by the copy pointer has not been allocated, the backup/restoration control program 204 executes processing in step S212 described below.

Then, the backup/restoration control program 204 increments the copy pointer (S212). The backup/restoration control program 204 judges whether the copy pointer has reached the end of the virtual volume (secondary virtual volume) or not (S214). If it is determined in step S214 that the copy pointer has reached the end of the secondary virtual volume, the backup/restoration control program 204 writes the termination information such as the backup terminate date and time and the number of volumes to the tape storage media 34 (S216).

Figure 14:
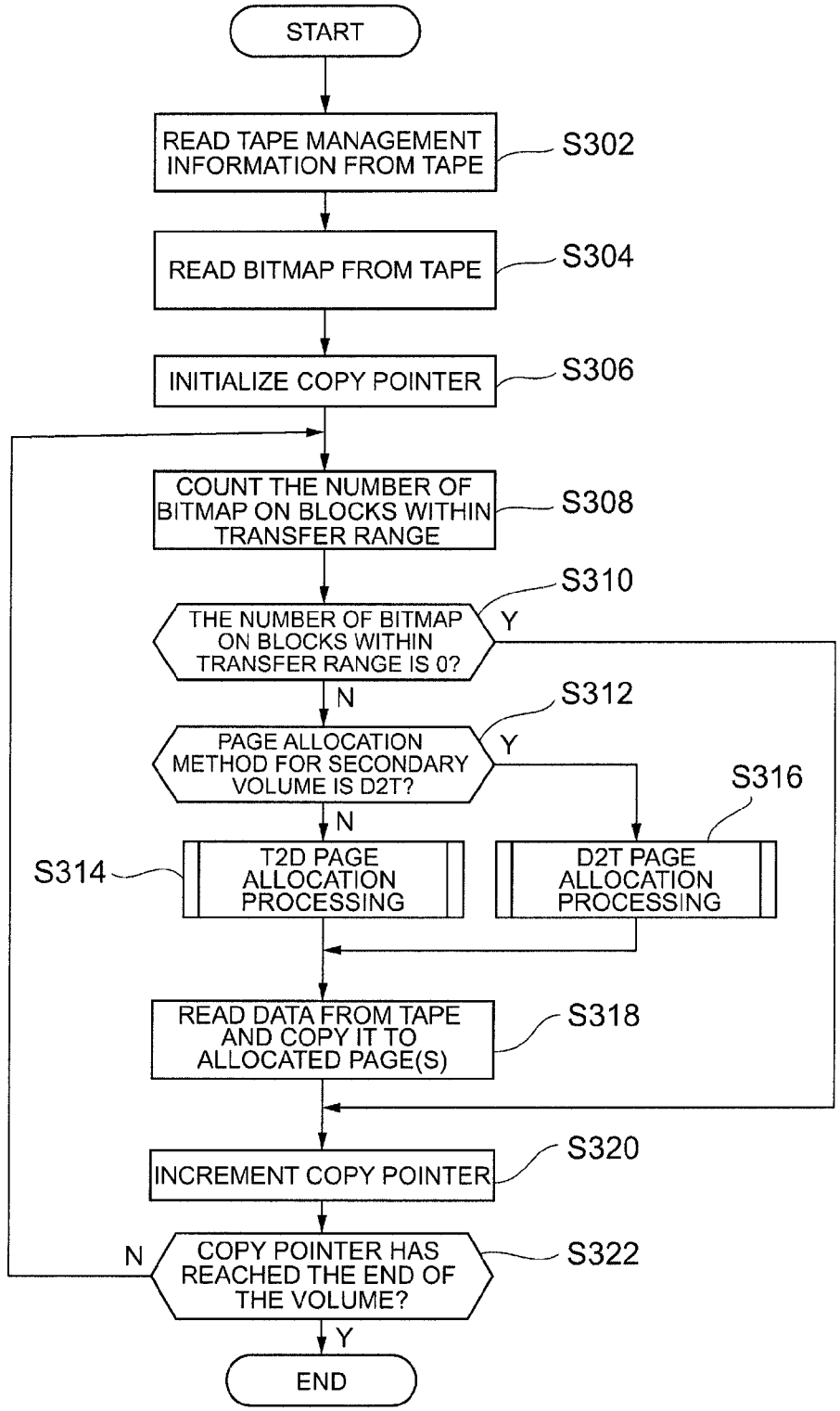
FIG. 14 is a flowchart illustrating processing for restoring data from tape storage media according to the embodiment.
Figure 15:
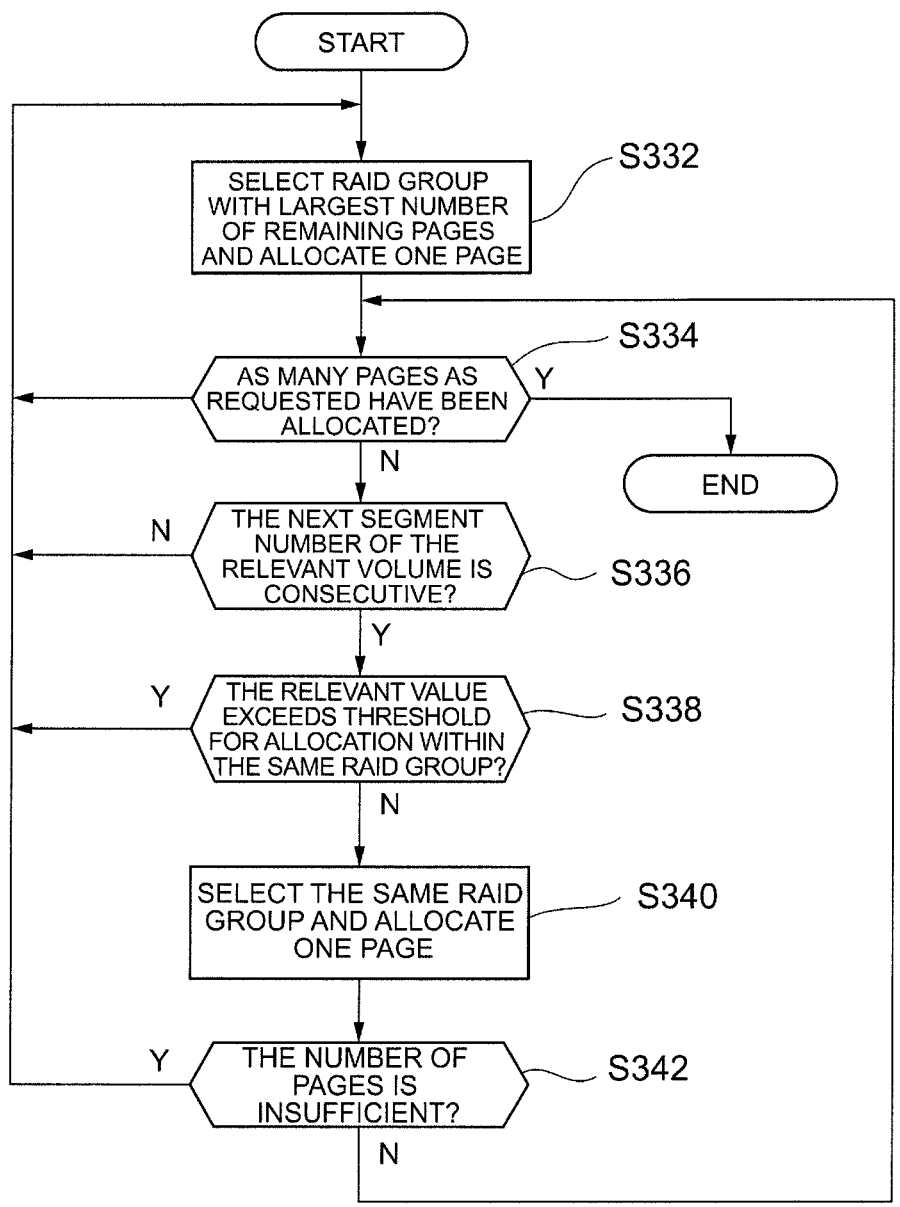
FIG. 15 is a flowchart illustrating page allocation processing for data restoration according to the embodiment.

Next, the page allocation processing for data restoration will be explained with reference to FIG. 14 and FIG. 15. FIG. 14 is a flowchart illustrating processing for judging the page allocation method for data restoration. As shown in FIG. 14, the backup/restoration control program 204 firstly reads the tape management information from the tape storage media 34 (S302). Then, the backup/restoration control program 204 reads the bitmap information from the tape storage media 34 (S304). The backup/restoration control program 204 initializes a copy pointer for the virtual volume which is an object to be restored (S305).

Next, the backup/restoration control program 204 counts the number of blocks whose bitmap is ON within the data transfer range in the bitmap read in step S304 (S308). The backup/restoration control program 204 judges whether the number of blocks whose bitmap is ON within the data transfer range, which was counted in step S308, is 0 or not (S310). If it is determined in step S310 that the number of blocks whose bitmap is ON within the transfer range is not 0, the thin provisioning control program 203 judges whether the page allocation method for the virtual volume (secondary volume) is D2T or not (S312). If it is determined in step S310 that the number of blocks whose bitmap is ON within the transfer range is 0, the thin provisioning control program 203 executes processing in step S320 described below.

In step S312, the thin provisioning control program 203 refers to the information stored in the page allocation method column 272 in the page allocation management table 270 shown in FIG. 9 and judges whether the allocation method is D2T or normal. The case where the allocation method is D2T is when the virtual volume is the backup object to be backed up to the tape storage media 34 as described earlier.

If it is determined in step S312 that the page allocation method for the secondary virtual volume is not D2T, the thin provisioning control program 203 executes T2D page allocation processing (S314). The T2D page allocation processing executed in step S314 will be explained later in detail. If it is determined in step S312 that the page allocation method for the secondary virtual volume is D2T, the thin provisioning control program 203 executes the D2T page allocation processing (S316). Since the D2T page allocation processing executed in step S316 is the same as the processing shown in FIG. 12, its detailed explanation has been omitted.

Then, the thin provisioning control program 203 reads the data from the tape storage media 34 and copies the data to the page(s) allocated in step S314 or step S316 (S318). Next, the thin provisioning control program 203 increments the copy pointer (S320). The thin provisioning control program 203 then judges whether or not the copy pointer has reached the end of the volume (S322).

If it is determined in step S322 that the copy pointer has reached the end of the volume, the thin provisioning control program 203 terminates the processing. If it is determined in step S322 that the copy pointer has not reached the end of the volume, the thin provisioning control program 203 executes the processing in step S308 and subsequent steps.

Next, the details of the T2D page allocation processing in step S314 of FIG. 14 will be explained with reference to FIG. 15. FIG. 15 is a flowchart illustrating the details of the T2D page allocation processing. As shown in FIG. 15, the thin provisioning control program 203 selects a RAID group with a largest number of remaining pages from among the RAID groups and allocates one page from the selected RAID group to the virtual volume which is an object to be restored (S332).

The thin provisioning control program 203 judges whether as many pages as requested by the host system 20 have been allocated or not (S334). If it is determined in step S334 that as many pages as requested have been allocated, the thin provisioning control program 203 terminates the processing. If it is determined in step S334 that as many pages as requested have not been allocated, the thin provisioning control program 203 judges whether the next segment number of the relevant volume is consecutive or not (S336).

If it is determined in step S336 that the next segment number of the relevant volume is consecutive, the thin provisioning control program 203 judges whether the least common multiple of the amount of data that can be transferred within average response time and the striping size of the RAID group exceeds the threshold for allocation from the same RAID group or not (S338). An example of the threshold for allocation from the same RAID group in step S338 can be the least common multiple of the amount of data that can be transferred within average response time of the tape management apparatus 30 relative to the host system 10 and the striping size of the RAID group as described earlier.

If it is determined in step S336 that the next segment number of the relevant volume is not consecutive, the thin provisioning control program 203 repeats executing the processing in step S332 and subsequent steps. If it is determined in step S338 that the least common multiple of the amount of data that can be transferred within average response time and the striping size of the RAID group does not exceed the threshold for allocation from the same RAID group, the thin provisioning control program 203 selects the same RAID group and allocates one page from the selected RAID group (S340). If it is determined in step S338 that the least common multiple of the amount of data that can be transferred within average response time and the striping size of the RAID group exceeds the threshold for allocation from the same RAID group, the thin provisioning control program 203 repeats executing the processing in step S332 and subsequent steps.

After one page is allocated from the RAID group in step S340, the thin provisioning control program 203 judges whether or not the number of pages for the secondary virtual volume is insufficient (S342). If it is determined in step S342 that the number of pages is insufficient, the thin provisioning control program 203 repeats executing processing in step S334 and subsequent steps. If it is determined in step S342 that the number of pages is not insufficient, the thin provisioning control program 203 repeats executing the processing in step S332 and subsequent steps.

Figure 16:
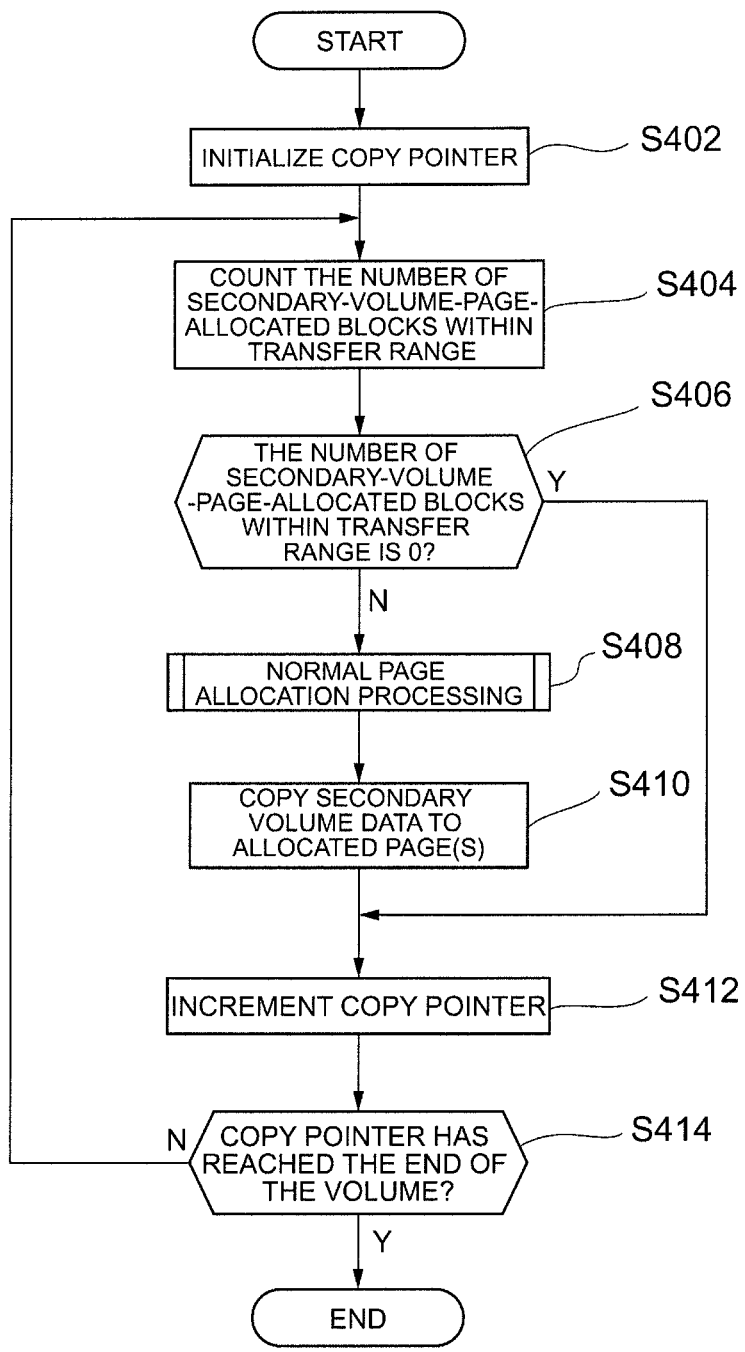
FIG. 16 is a flowchart illustrating data restoration processing according to the embodiment.

Next, processing for restoring data from the secondary virtual volume to the primary virtual volume will be explained with reference to FIG. 16. As shown in FIG. 16, the backup/restoration control program 204 firstly initializes a copy pointer for the secondary virtual volume (S402).

Subsequently, the backup/restoration control program 204 counts the number of page-allocated blocks of the secondary virtual volume within the transfer range (S404). The backup/restoration control program 204 judges whether the number of page-allocated blocks of the secondary virtual volume within the transfer range, which was counted in step S404, is 0 or not (S406). If it is determined in step S406 that the number of page-allocated blocks of the secondary virtual volume within the transfer range is 0, the backup/restoration control program 204 executes processing in step S412 and subsequent steps described below.

If it is determined in step S406 that the number of page-allocated blocks of the secondary virtual volume within the transfer range is not 0, the thin provisioning control program 203 executes the normal page allocation processing (S408).

Since the normal page allocation processing in step S408 is the same as the normal page allocation processing shown in FIG. 11, its detailed explanation has been omitted.

Then, the backup/restoration control program 204 reads the data of the secondary virtual volume and copies the data to the page(s) allocated in step S408 (S410). Subsequently, the backup/restoration control program 204 increments the copy pointer (S412). The backup/restoration control program 204 then judges whether or not the copy pointer has reached the end of the volume (S414).

If the backup/restoration control program 204 determines in step S414 that the copy pointer has reached the end of the volume, it terminates the processing. If the backup/restoration control program 204 determines in step S414 that the copy pointer has not reached the end of the volume, it executes the processing in step S404 and subsequent steps.

4. Advantageous Effects of this Embodiment

According to this embodiment, the storage apparatus 20 stores data, for which a write request is issued from the host system 10, in a virtual volume and allocates a predetermined area in a plurality of storage devices to a data storage area in the virtual volume storing the data. If the virtual volume is a backup object to be backed up to tape storage media, the storage apparatus 20 allocates a predetermined area in a specified storage device, from among the plurality of storage devices, to the data storage area in the virtual volume; and if the virtual volume is not a backup object to be backed up to the tape storage media, the storage apparatus allocates a predetermined area in an unspecified storage device, from among the plurality of storage devices, to the data storage area in the virtual volume. Therefore, when backing up the data stored in the virtual volume to the tape storage media, it is unnecessary to access the unspecified storage device at the same time. As a result, it is possible to prevent the occurrence of access conflicts to the storage devices and enhance the performance to transfer data to the tape storage media.

5. Other Embodiments

Preferred embodiments of this invention have been described in detail with reference to the attached drawings. However, this invention is not limited only to these embodiments. It is apparent that a person with an ordinary skill in the art to which the invention pertains could easily think of various change examples or modification examples within the category of technical ideas described in the scope of claims. It is understood as a matter of course that such change examples or modification examples also belong to the technical scope of this invention.

The aforementioned embodiment has described the case where the secondary virtual volume is backed up to the tape storage media. However, the invention is not limited to this example. For example, if the primary virtual volume is a backup object to be backed up to the tape storage media, an arbitrary page(s) of a specified RAID group constituting a first storage pool associated with the primary virtual volume may be allocated from the first storage pool to the relevant segment of the primary virtual volume.

Furthermore, in the above-described embodiment, a page allocation method for a pool volume is changed depending on whether or not a plurality of virtual volumes are backed up to the tape storage media. However, the invention is not limited to this example. For example, the page allocation method may be also changed for each virtual volume when virtual volumes to be used for a different purpose exist with other virtual volumes, for example, in a case where some of the virtual volumes are backed up to the tape storage media.

For example, steps in the processing by the storage apparatus 20 as described in this specification do not necessarily have to be executed chronologically in the order described in the relevant flowchart. In other words, each step in the processing by the storage apparatus 20 may be executed in different processing or those steps may be executed in parallel.

Furthermore, it is possible to create a computer program for having the hardware such as the CPU, ROM, RAM, etc. contained in the storage apparatus 20 fulfill functions equivalent to those of each component of the storage apparatus 20 described earlier. It is also possible to provide a storage medium in which such a computer program is stored.

INDUSTRIAL APPLICABILITY

The present invention can be used in a computer system for backing up data, which is stored in a virtual volume(s) of a storage apparatus, to tape storage media and restoring the data from the tape storage media upon the occurrence of a disk failure.

REFERENCE SIGNS LIST

10 Host system
20 Storage apparatus
21 Controller
22 Storage device
30 Tape management apparatus
31 Carrier mechanism
32 Tape drive
34 Tape storage media
40 Network
50 Management terminal

The invention claimed is:

1. A storage apparatus connected via a network to a host system for requesting writing of data and connected to a tape management apparatus for managing tape storage media for storing the data, the storage apparatus comprising:
   a plurality of storage devices configuring a plurality of device groups;
   a plurality of virtual volumes including a first virtual volume provided to the host system and a second virtual volume configuring a copy pair with the first virtual volume; and
   a storage controller including a storage unit, an allocation unit, and a mirroring unit, the storage unit for storing data in the plurality of storage devices, the host system issuing a write request to the first virtual volume to write the data to the storage unit, the allocation unit for allocating a predetermined area in the plurality of storage devices to a data storage area in the first virtual volume in which the data is stored by the storage unit, and the mirroring unit for copying data from the first virtual volume to the second virtual volume according to the copy pair,
   wherein when the mirroring unit is configured to copy data from the first virtual volume to the second virtual volume according to the copy pair, the storage controller determines whether the second virtual volume is a backup object to be backed up to the tape storage media,
   wherein when a determination is made that the second virtual volume is not a backup object to be backed up to the tape storage media, the storage controller selects a device group, of the plurality of device groups, having the largest number of remaining predetermined areas, excluding a device group from which a predetermined area was last allocated, and then allocates, to the second virtual volume, a predetermined area from the selected device group, of the plurality of device groups, so that data of the second virtual volume is stored in the plurality of device groups, wherein when a determination is made that the second virtual volume is a backup object to be backed up to the tape storage media, a determination is made as to whether a device group, of the plurality of device groups, has been specified for the second virtual volume, wherein when the determination as to whether the device group has been specified for the second virtual volume indicates there is no specified device group, a device group, of the plurality of device groups, having a smallest disk-to-tape (D2T) transfer quantity and a largest number of remaining predetermined areas, is selected as the specified device group, and the storage controller allocates a predetermined area in the specified device group to the second virtual volume, so that data of the second virtual volume is stored to the specified device group, and the data storage area in the first virtual volume is stored in the plurality of device groups, and restores data from the tape storage media to the second virtual volume by storing data of the tape storage media in the specified device group, and wherein when the determination as to whether the device group has been specified for the second virtual volume indicates there is a specified device group, the storage controller allocates a predetermined area in the specified device group to the second virtual volume, so that data of the second virtual volume is stored to the specified device group, and the data storage area in the first virtual volume is stored in the plurality of device groups, and restores data from the tape storage media to the second virtual volume by storing data of the tape storage media in the specified device group.

2. The storage apparatus according to claim 1, wherein the allocation unit allocates a storage device, of the plurality of storage devices, to which a smallest number of virtual volumes are already allocated, to the data storage area in the first virtual volume.

3. The storage apparatus according to claim 1, further comprising:
a backup object management table for associating identification information for identifying virtual volumes, of the plurality of virtual volumes, with a flag for determining whether each of the virtual volumes is a backup object to be backed up to the tape storage media.

4. The storage apparatus according to claim 1,
wherein the plurality of device groups constitute a plurality of RAID (Redundant Array of Inexpensive Disks) groups.

5. The storage apparatus according to claim 4,
wherein the allocation unit receives a command from the host system to restore data from the tape storage media to the second virtual volume, and
wherein when data storage areas in the first virtual volume sequentially stored in the tape storage media, the allocation unit allocates a predetermined area in the storage devices constituting the a RAID group, of the plurality of RAID groups, to the data storage areas.

6. The storage apparatus according to claim 5, wherein the allocation unit sets a least common multiple of an amount of data that can be transferred within an average response time of the tape management apparatus relative to the host system, and an amount of data in the storage devices constituting the RAID group, as a threshold for allocation from the RAID group.

7. A storage management method implemented in a storage apparatus, the storage apparatus being connected via a network to a host system for requesting writing of data and connected to a tape management apparatus for managing tape storage media for storing the data, the storage apparatus including: a plurality of storage devices configuring a plurality of device groups; a plurality of virtual volumes including a first virtual volume provided to the host system and a second virtual volume configuring a copy pair with the first virtual volume; and a storage controller including a storage unit, an allocation unit, and a mirroring unit, the storage management method comprising:

storing, by the storage unit, data in the plurality of storage devices, the host system issuing a write request to the first virtual volume to write the data to the storage unit;

allocating, by the allocation unit, a predetermined area in the plurality of storage devices to a data storage area in the first virtual volume in which the data is stored by the storage unit;

copying, by the mirroring unit, data from the first virtual volume to the second virtual volume according to the copy pair;

when the mirroring unit is configured to copy data from the first virtual volume to the second virtual volume according to the copy pair, determining, by the storage controller, whether the second virtual volume is a backup object to be backed up to the tape storage media;

when a determination is made that the second virtual volume is not a backup object to be backed up to the tape storage media, selecting a device group, of the plurality of device groups, having the largest number of remaining predetermined areas, excluding a device group from which a predetermined area was last allocated, and then allocating to the second virtual volume, by the storage controller, a predetermined area from the selected device group, of the plurality of device groups so that data of the second virtual volume is stored in the plurality of device groups; and when a determination is made that the second virtual volume is a backup object to be backed up to the tape storage media, determining whether a device group, of the plurality of device groups, has been specified for the second virtual volume;

when a determination as to whether the device group has been specified for the second virtual volume indicates there is no specified device group, selecting a device group, of the plurality of device groups, having a smallest disk-to-tape (D2T) transfer quantity and a largest number of remaining predetermined areas, as the specified device group, and allocating a predetermined area in the specified device group to the second virtual volume, so that data of the second virtual volume is stored to the specified device group, and the data storage area in the first virtual volume is stored in the plurality of device groups, and restoring data from the tape storage media to the second virtual volume by storing data of the tape storage media in the specified device group; and when the determination as to whether the device group has been specified for the second virtual volume indicates there is a specified device group, allocating, by the storage controller, a predetermined area in a specified device group to the second virtual volume, so that data of the second virtual volume is stored to the specified device group, and the data storage area in the first virtual volume is stored in the plurality of device groups, and restoring data from the tape storage media to the second virtual volume by storing data of the tape storage media in the specified device group.

* * * * *